US 8,953,215 B2
United States Patent
Goto et al.

(10) Patent No.: US 8,953,215 B2
(45) Date of Patent: Feb. 10, 2015

(54) IMAGE FORMING APPARATUS, IMAGE FORMING METHOD, NON-TRANSITORY COMPUTER-READABLE MEDIUM, AND TEST DATA

(71) Applicant: Fuji Xerox Co., Ltd., Minato-ku, Tokyo (JP)

(72) Inventors: Osamu Goto, Kanagawa (JP); Tomohiro Tanigawa, Kanagawa (JP)

(73) Assignee: Fuji Xerox Co., Ltd., Tokyo (JP)

( * ) Notice: Subject to any disclaimer, the term of this patent is extended or adjusted under 35 U.S.C. 154(b) by 7 days.

(21) Appl. No.: 13/775,829

(22) Filed: Feb. 25, 2013

(65) Prior Publication Data
US 2014/0022565 A1 Jan. 23, 2014

(30) Foreign Application Priority Data
Jul. 23, 2012 (JP) .................................. 2012-162464

(51) Int. Cl.
*G06F 15/00* (2006.01)
*H04N 1/23* (2006.01)
*H04N 1/00* (2006.01)

(52) U.S. Cl.
CPC ......... *H04N 1/2323* (2013.01); *H04N 1/00015* (2013.01); *H04N 1/00031* (2013.01); *H04N 1/00045* (2013.01); *H04N 1/00082* (2013.01); *H04N 1/0009* (2013.01); *H04N 2201/0414* (2013.01); *H04N 2201/0091* (2013.01)
USPC ........... 358/1.2; 358/1.12; 358/474; 358/468; 348/36

(58) Field of Classification Search
None
See application file for complete search history.

(56) References Cited

U.S. PATENT DOCUMENTS

| 7,194,144 B1 | 3/2007 | Sakai et al. | |
|---|---|---|---|
| 2006/0219964 A1* | 10/2006 | Mochizuki et al. | 250/580 |
| 2007/0127087 A1* | 6/2007 | Nabemoto et al. | 358/468 |
| 2009/0244651 A1* | 10/2009 | Aoshima | 358/474 |
| 2011/0228301 A1* | 9/2011 | Fujiwara | 358/1.12 |
| 2012/0120099 A1* | 5/2012 | Ishizuka | 345/620 |
| 2012/0194636 A1* | 8/2012 | Tokunaga et al. | 348/36 |

FOREIGN PATENT DOCUMENTS

| JP | 04-317247 A | 11/1992 |
|---|---|---|
| JP | 2000-278514 A | 10/2000 |
| JP | 2001-061053 A | 3/2001 |
| JP | 2003-018393 A | 1/2003 |
| JP | 2005-333359 A | 12/2005 |

\* cited by examiner

*Primary Examiner* — Kimberly A Williams
*Assistant Examiner* — Helen Q Zong
(74) *Attorney, Agent, or Firm* — Sughrue Mion, PLLC

(57) ABSTRACT

An image forming apparatus includes a document reading section and an image forming section. The document reading section reads a document image placed on a paper placement table and generates image data. The image forming section forms an image on a sheet of paper on the basis of the image data, and includes a memory that stores test data representing a test image, which is to be formed on a sheet of paper having a size larger than the size of the table, a correction-amount calculation unit that calculates correction amounts on the basis of image data representing the test image which is formed on the sheet of paper and which has been read by repeating an operation, and a correction-amount memory that stores the correction amounts. The image forming section forms, on a sheet of paper, an image corrected on the basis of the correction amounts.

11 Claims, 5 Drawing Sheets

IMAGE FORMING APPARATUS, IMAGE FORMING METHOD, NON-TRANSITORY COMPUTER-READABLE MEDIUM, AND TEST DATA

CROSS-REFERENCE TO RELATED APPLICATIONS

This application is based on and claims priority under 35 USC 119 from Japanese Patent Application No. 2012-162464 filed Jul. 23, 2012.

BACKGROUND

1. Technical Field

The present invention relates to an image forming apparatus, an image forming method, a non-transitory computer-readable medium, and test data.

2. Summary

According to an aspect of the invention, there is provided an image forming apparatus including a document reading section and an image forming section. The document reading section reads a document image placed on a paper placement table and generates image data. The image forming section forms an image on a sheet of paper on the basis of the image data generated by the document reading section. The image forming section includes a memory that stores test data representing a test image. The test image is an image which is to be formed on a sheet of paper having a size larger than the size of the paper placement table, which is to be used to obtain correction amounts that are to be used in image correction, which has regions, and which includes multiple identification images in a case where the entire test image is planned to be read by performing, multiple times, an operation of placing a sheet of paper on which the test image is formed on the paper placement table in such a manner that one of portions of the sheet of paper is placed on the paper placement table and the other portions of the sheet of paper are present outside the paper placement table and of reading an image that is formed on the portion of the sheet of paper placed on the paper placement table and that is included in one of the regions of the test image, while the sheet of paper placed on the paper placement table is being changed from one orientation to another orientation among multiple orientations. Each of the multiple identification images is an image which is formed on the portion of the sheet of paper that is placed on the paper placement table so as to have a corresponding one of the multiple orientations and which is to be used to determine a corresponding one of the regions of the test image. The multiple identification images are dispersively disposed in the test image so that each of the multiple identification images is included in the portion of the sheet of paper which is placed on the paper placement table so as to have a corresponding one of the multiple orientations. The image forming section has a test-image formation mode in which the test image based on the test data stored in the memory is formed on a sheet of paper having a size larger than the size of the paper placement table. The image forming section further includes a correction-amount calculation unit and a correction-amount memory. The correction-amount calculation unit calculates the correction amounts, which are to be used in image correction, on the basis of image data representing the test image which has been read by repeatedly performing the operation of placing a sheet of paper on which the test image has been formed in the test-image formation mode on the paper placement table in such a manner that one of portions of the sheet of paper is placed on the paper placement table and the other portions of the sheet of paper are present outside the paper placement table and of reading an image that is included in one of the regions of the test image. The correction-amount memory stores the correction amounts calculated by the correction-amount calculation unit. The image forming section forms, on a sheet of paper, an image that has been corrected on the basis of the correction amounts stored in the correction-amount memory.

BRIEF DESCRIPTION OF THE DRAWINGS

An exemplary embodiment of the present invention will be described in detail based on the following figures, wherein.

DETAILED DESCRIPTION

Hereinafter, an exemplary embodiment of the present invention will be described with reference to the drawings.

Figure 1:
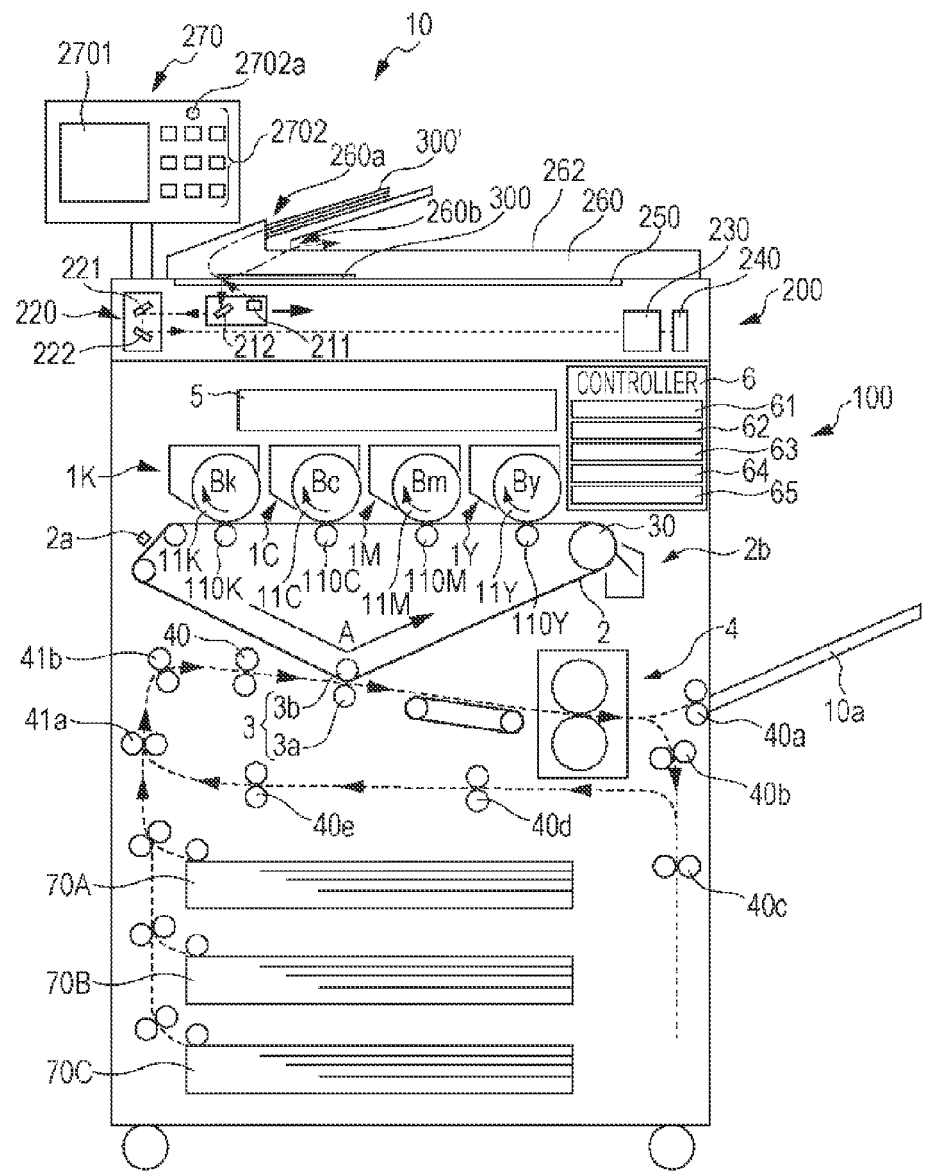
FIG. 1 is an overall configuration diagram of an image forming apparatus according to a present exemplary embodiment.

FIG. 1 is an overall configuration diagram of an image forming apparatus 10 according to the present exemplary embodiment.

The image forming apparatus according to the present exemplary embodiment is a copier that has a single-sided output function and that also has a double-sided output function.

The image forming apparatus 10 includes an image reading section 200, an image forming section 100, and an operation section 270. The image reading section 200 reads an image formed on a sheet of paper and generates an image data item representing the image. The image forming section 100 forms the read image on another sheet of paper on the basis of the image data item. The operation section 270 receives, from a user, inputs of various types of image formation information, such as a specification of the number of sheets of paper to be output, a selection of double-sided output or single-sided output, and a specification of a tray in which sheets of paper on which images are to be formed are stored.

The operation section 270 includes a touch-panel-type display screen 2701 and a button group 2702. The button group 2702 is constituted by various types of buttons, such as a start button that is used to provide an instruction to start reading an image and forming the image, numeric buttons that are used to input a numerical value in the case of specifying the number of sheets of paper to be output, and control buttons that are used to control the image forming apparatus 10. A correction-amount calculation-mode button 2702a is also included in the button group 2702. The correction-amount calculation-mode button 2702a is used to, for a case where an image is to be formed on a sheet of paper, set the image forming apparatus 10 to be in a correction-amount calculation mode in which various types of correction amounts, such as a correction amount for the position at which an image is to be formed on a sheet of paper and a correction amount for the magnification of an image on a sheet of paper, are calculated. Calculation of the correction amounts will be described below in detail.

The image reading section 200 includes an upper covering 260 that is opened/closed by the user, and a transparent glass 250 that is placed immediately under the upper covering 260. The image reading section 200 further includes elements that are provided below the transparent glass 250 and that are used to perform reading of an image formed on a sheet of paper.

The image reading section 200 includes, as the elements used to perform reading of an image, a first carriage 210, a second carriage 220, a lens unit 230, and a charge-coupled device (CCD) line sensor 240. The first carriage 210 has a first mirror 212 and a lamp 211, and is an element that is movable in the left-right directions of FIG. 1. The first carriage 210 functions to irradiate, using the lamp 211, an image, which is to be read, with light, and to receive reflected light. The second carriage 220 has a second mirror 221 and a third mirror 222, and, similarly to the first carriage 210, is an element that is movable in the left-right directions of FIG. 1. The second carriage 220 and the lens unit 230 function to lead the reflected light, which has been received by the first carriage 210, to the CCD line sensor 240. Furthermore, the CCD line sensor 240 functions to receive the reflected light and to generate an image data item representing the image.

Here, the image reading section 200 has a transporting reading mode and a stationary reading mode as reading modes in which an image formed on a sheet of paper is read. In the transporting reading mode, a sheet of paper 300' placed on a document tray 261 is drawn from a paper feeding port 260a one by one, and is transported by a mechanism, which is not illustrated, to an ejection port 260b along a transport path indicated by the dashed-dotted-line arrow. The transporting reading mode is a reading mode in which an image formed on a sheet of paper that is being transported is read using the first carriage 210 that is in a stationary state, and in which the sheet of paper is sent out onto a paper output table 262. Additionally, the stationary reading mode is a reading mode in which a sheet of paper is made stationary on the transparent glass 250, and in which an image formed on the sheet of paper is read using the first carriage 210 that moves in the direction indicated by the solid-line arrow illustrated in FIG. 1. In the stationary reading mode, a face of the transparent glass 250 that is the face which opposes the upper covering 260 serves as a paper placement table on which the sheet of paper 300 having an image to be read is placed. Here, the user opens the upper covering 260, places the sheet of paper 300 on the transparent glass 250 so that a side of the sheet of paper 300 that is a side having an image to be read is oriented to the downward direction of FIG. 1, and closes the upper covering 260, whereby the sheet of paper 300 is pressed from the above. In the stationary reading mode, in this state, the first carriage 210 irradiates the sheet of paper 300, which is placed on the transparent glass 250, with light while moving, whereby the image formed on the sheet of paper 300 is read. When the first carriage 210 moves, the second carriage 220 also moves in the same direction at half the speed of the first carriage 210 so that the length of an optical path along which the light is reflected from the sheet of paper 300 and reaches the CCD line sensor 240 is maintained at the same value.

The image forming section 100 includes image forming units 1K, 1C, 1M, and 1Y for forming images of individual colors of black (K), cyan (C), magenta (M), and yellow (Y), respectively, and an exposure unit 5 that irradiates the image forming units 1K, 1C, 1M, and 1Y with laser light. The image forming units 1K, 1C, 1M, and 1Y include multilayer electrophotographic developer carriers 11K, 11C, 11M, and 11Y that rotate in directions of arrows Bk, Bc, Bm, and By illustrated in FIG. 1, respectively. Here, each of the image forming units 1K, 1C, 1M, and 1Y further includes a charging device and a developing device that are not illustrated, in addition to the corresponding developer carrier described above. The developer carrier in each of the image forming units is charged by the charging device, which is not illustrated, so that a surface potential reaches a predetermined potential. The exposure unit 5 performs raster scanning using laser light on each of the charged developer carriers 11K, 11C, 11M, and 11Y in the direction along the rotation axis of the rotating developer carrier, whereby an electrostatic latent image based on a potential distribution is formed on the developer carrier. The developing device, which is not illustrated, causes toner contained in a developer including charged toner to electrostatically adhere to this electrostatic latent image, thereby developing the electrostatic latent image. Accordingly, an image developed using the toner is formed on the developer carrier.

Under the individual image forming units 1K, 1C, 1M, and 1Y illustrated in FIG. 1, an intermediate transfer belt 2 is provided. The intermediate transfer belt 2 moves in the direction of arrow A illustrated in FIG. 1 while being in contact with the individual developer carriers 11K, 11C, 11M, and 11Y. At positions facing the developer carriers 11K, 11C, 11M, and 11Y via the intermediate transfer belt 2, first transfer rollers 110K, 110C, 110M, and 110Y are provided, respectively. The developed images formed on the individual developer carriers 11K, 11C, 11M, and 11Y are transferred (first transfer) onto the intermediate transfer belt 2, and the intermediate transfer belt 2 transports first transfer images.

Moreover, in addition to the image forming units 1K, 1C, 1M, and 1Y, the intermediate transfer belt 2, and the exposure unit 5 described above, the image forming section 100 further includes a second transfer roller 3a and a fixing device 4. The second transfer roller 3a performs second transfer in which the first transfer images on the intermediate transfer belt 2 are transferred onto a sheet of paper. The fixing device 4 fixes an unfixed second transfer image, which has been transferred onto the sheet of paper, on the sheet of paper. Additionally, a sensor 2a is provided in the vicinity of the intermediate transfer belt 2. The sensor 2a detects inspection images of individual colors which have been formed by the corresponding image forming units 1K, 1C, 1M, and 1Y and which have been transferred onto the intermediate transfer belt 2, in the case of adjusting the relative positions between the first transfer images, which have been transferred from the individual developer carriers 11K, 11C, 11M, and 11Y, and magnifications of the first transfer images. In the case of adjustment of the relative positions and magnifications, the sensor 2a detects the inspection images of the individual colors that have been transferred onto the intermediate transfer belt 2 to obtain a detection result. On the basis of the detection result, the image forming units 1K, 1C, 1M, and 1Y are adjusted so that the relative positions between the inspection images of the individual colors and magnifications of the inspection images of the individual colors are made appropriate.

Additionally, the image forming section 100 also includes three trays in which sheets of paper are stored, i.e., a first tray 70A, a second tray 70B, and a third tray 70C, and a driving roller 30 that drives the intermediate transfer belt 2. The intermediate transfer belt 2 rotates, in a state of being stretched around the driving roller 30 and multiple other rollers, in the direction of the arrow A illustrated in FIG. 1 while receiving a driving force from the driving roller 30. The intermediate transfer belt 2 is pressed toward the second transfer roller 3a by a backup roller 3b. The first transfer images on the intermediate transfer belt 2 are subjected to second transfer by the action of the second transfer roller 3a so as to be transferred onto a sheet of paper, which has been taken out from one of the first tray 70A, the second tray 70B, and the third tray 70C and which has been transported to the second transfer roller 3a. The sheet of paper subjected to second transfer is further transported, and a second transfer image on the sheet of paper is fixed on the sheet of paper by the fixing device 4. The sheet of paper is output to a paper output tray 10a. Here, a cleaning device 2b is provided in the vicinity of the intermediate transfer belt 2, and residual toner that remains on the intermediate transfer belt 2 after second transfer onto the sheet of paper has been performed is removed by the cleaning device 2b. Furthermore, the above-described inspection images of the individual colors that have been formed on the intermediate transfer belt 2 in the case of adjusting the relative positions between the first transfer images, which have been transferred from the individual developer carriers, and magnifications of the first transfer images are also removed by the cleaning device 2b without being subjected to second transfer by the second transfer roller 3a.

The image forming apparatus 10 includes a controller 6 that controls individual units included in the image forming section 100. The controller 6 includes a read-image memory 64 that stores image data items generated by the CCD line sensor 240 of the image reading section 200 described above. Furthermore, in the image forming apparatus 10, misregistration of the position at which an image is formed or a change in the magnification of an image on a sheet of paper occurs because of, for example, an error in transport of the sheet of paper or an error in the size or position of any of the image forming units 1K, 1C, 1M, and 1Y. Accordingly, although the details will be described below, in the image forming apparatus 10, a test image is formed on a sheet of paper, the test image on the sheet of paper is read by the image reading section 200, and various types of correction amounts, such as the correction amount for the position at which an image is to be formed on a sheet of paper and the correction amount for the magnification of an image on a sheet of paper, are calculated. Accordingly, in addition to the read-image memory 64 described above, the controller 6 includes a test-image memory 65 that stores a test-image data item representing the test image used in calculation of the correction amounts, which will be described below. Moreover, the controller 6 also includes a first-tray memory group 61, a second-tray memory group 62, and a third-tray memory group 63 that store the calculated correction amounts and that correspond to the first tray 70A, the second tray 70B, and the third tray 70C described above, respectively. The reason why each of the memory groups that store the correction amounts is provided for a corresponding one of the trays as described above is that the degree of misregistration of the position at which an image is to be formed or the degree of a change in the magnification of an image on a sheet of paper may differ with a path along with a sheet of paper is taken out from a tray. Here, each of the memory groups includes three memories (not illustrated) that are a memory for plain paper, a memory for thin paper, and a memory for thick paper which correspond to the types of paper (plain paper, thin paper, and thick paper, respectively). In each of the memory for plain paper, the memory for thin paper, and the memory for thick paper of each of the memory groups, for a case where an image is to be formed on a sheet of paper that has been taken out from a tray corresponding to the memory group, the correction amounts that are to be used to correct, for example, the position at which the image is to be formed and the magnification of the image on a sheet of paper are stored for a corresponding one of the types of paper (plain paper, thin paper, or thick paper). The reason why each of the memories that store the correction amounts is provided for a corresponding one of the types of paper (plain paper, thin paper, or thick paper) as described above is that the degree of misregistration of the position at which an image is to be formed on a sheet of paper or the degree of a change in the magnification of an image on a sheet of paper may differ with the type of paper. Here, a configuration is used, in which a setting indicating which size and type of paper (plain paper, thin paper, or thick paper) is to be stored in each of the first tray 70A, the second tray 70B, and the third tray 70C is set in advance. Even after the power is turned off and on, the previous setting is valid unless the setting is set again. Note that, a configuration for automatically detecting a size or the like may be included in the exemplary embodiment of the present invention.

In the case of forming an image based on an image data item stored in the read-image memory 64 on a sheet of paper, the controller 6 reads, in accordance with a tray specified by an operation performed by the user via the operation section 270, the correction amounts from a memory that is included in a memory group corresponding to the specified tray and that corresponds to the type of paper which is set in advance for sheets of paper stored in the tray. The controller 6 performs, on the basis of the read correction amounts, on the image data item stored in the read-image memory 64, various types of correction processes, such as a process of correcting the position at which the image is to be formed and a process of correcting the magnification of the image. The controller 6 causes the above-described exposure unit 5 to form electrostatic latent images on the basis of the image data item subjected to the correction processes. Here, the correction amounts are constituted by two types of correction amounts that are correction amounts for the front side which are to be used for a case where an image is to be formed on the front side when double-sided output is specified and correction amounts for the rear side which are to be used for a case where an image is to be formed on the rear side when double-sided output is specified. In the case of image formation, when double-sided output is specified, the correction processes are performed, on the basis of the correction amounts for the front side, on an image data item representing an image that is to be formed on the front side which is a side on which an image is to be output first among both sides of a sheet of paper. Then, the correction processes are performed, on the basis of the correction amounts for the rear side, on an image data item representing an image that is to be formed on the rear side which is a side on which an image is to be output second. In contrast, in the case of image formation, when single-sided output is specified, the correction processes are performed on an image data item on the basis of the correction amounts for the front side.

Next, a series of operations starting with an operation of reading an image and ending with an operation of forming the image on a sheet of paper, which are performed in the image forming apparatus 10, will be described. Here, the series of operations will be described using, as an example, the case where the stationary reading mode is employed.

A sheet of paper is placed by the user between the transparent glass 250 and the upper covering 260 so that a side of the sheet of paper which is a side having an image to be read is oriented to the downward direction of FIG. 1. Then, using the operation section 270, for example, a tray in which sheets of paper to be used in image formation are stored is specified, double-sided output or single-sided output is selected, and the number of sheets of paper to be output is specified. When a start button (not illustrated) that is included in the button group 2702 and that is used to provide an instruction to read an image and form the image has been pressed, light is emitted from the lamp 211 included in the first carriage 210. The light emitted from the lamp 211 is reflected by the sheet of paper 300 through the transparent glass 250. An image is formed by the lens unit 230 using the reflected light on the CCD line sensor 240 via the first mirror 212 of the first carriage 210 and the second mirror 221 and the third mirror 222 of the second carriage 220. In FIG. 1, the path of the light is indicated by the dotted-line arrow shown in the image reading section 200. The first carriage 210 moves in the direction (sub-scanning direction) of the solid-line arrow shown in the image reading section 200 while irradiating the sheet of paper 300 with light using the lamp 211. Furthermore, the second carriage 220 also moves in the same direction at half the moving speed of this first carriage 210. Accordingly, an entire image on the sheet of paper 300 is irradiated, and an image is formed on the CCD line sensor 240 while the optical-path length of the light reflected from any portion of the image on the sheet of paper 300 is being maintained at a fixed value. In this manner, an image data item based on the reflected light for the entire image is generated by the CCD line sensor 240. The generated image data item is subjected to various types of signal processing, such as analog-to-digital conversion, by a processing circuit that is not illustrated. After that the image data item is transmitted to the controller 6, and is stored in the read-image memory 64 included in the controller 6. Every time the user places the other side of the sheet of paper 300 or a side of a new sheet of paper that is a side having a new image on the transparent glass 250 and presses the start button, generation of an image data item and storage of the image data item in the read-image memory 64 described above are repeatedly performed.

The controller 6 reads, for the image data item stored in the read-image memory 64, in accordance with a specified tray, the correction amounts from a memory which is included in a memory group corresponding to the specified tray among the first-tray memory group 61, the second-tray memory group 62, and the third-tray memory group 63 and which corresponds to the type of paper that is set in advance for the tray. The controller 6 performs, on the basis of the read correction amounts, various types of correction processes, such as a process of correcting the position at which an image is to be formed and a process of correcting the magnification of an image, on the image data item stored in the read-image memory 64. Then, the controller 6 causes the exposure unit 5 to form electrostatic latent images based on the image data item, which has been subjected to the correction processes, on the charged developer carriers 11K, 11C, 11M and 11Y. The formed electrostatic latent images are developed by the developing devices included in the image forming units 1K, 1C, 1M, and 1Y, using toners in developers including toners of the colors corresponding to the individual image forming units 1K, 1C, 1M, and 1Y, whereby developed images of the individual colors are formed. The developed images of the individual colors formed on an image-forming-unit-by-image-forming-unit basis in this manner are sequentially transferred (first transfer) onto the intermediate transfer belt 2 by the first transfer rollers 110K, 110C, 110M, and 110Y corresponding to the individual developer carriers 11K, 11C, 11M, and 11Y, respectively, so as to overlap one another, whereby first transfer images of multiple colors are formed. Then, the first transfer images of multiple colors are transported by the intermediate transfer belt 2 to the second transfer roller 3a.

Meanwhile, a sheet of paper stored in the specified tray among the first tray 70A, the second tray 70B, and the third tray 70C is taken out in response to formation of the first transfer images of multiple colors. The sheet of paper is transported by a first transport roller pair 41a and a second transport roller pair 41b. Further, the orientation of the sheet of paper is adjusted by an alignment roller pair 40. Further, the sheet of paper is sent out by the alignment roller pair 40 so that the time at which the first transfer images on the intermediate transfer belt 2 reach the position of the second transfer roller 3a coincides with the time at which the sheet of paper reaches the position. The first transfer images of multiple colors are transferred (second transfer) by the second transfer roller 3a onto the sheet of paper that has been sent out. The sheet of paper subjected to the second transfer is further transported by a transport belt 31. A fixing process is performed on a second transfer image on the sheet of paper by the fixing device 4. In FIG. 1, a sheet transport path at this time is illustrated as a path indicated by the right dotted-line arrow shown in the image forming section 100. Note that residual toner that remains on the intermediate transfer belt 2 after second transfer onto the sheet of paper has been performed is removed by the cleaning device 2b.

In the case where single-sided output is selected, the sheet of paper passes along this sheet transport path only once, and the second transfer image is fixed by the fixing device 4 on the sheet of paper. After that, the sheet of paper passes between the rollers of an export roller pair 40a, and is output to the paper output tray 10a.

In contrast, in the case where double-sided output is selected, the sheet of paper passes along the above-described sheet transport path indicated by the right arrow, whereby the second transfer image is transferred and fixed on one side of the sheet of paper. After that, the sheet of paper passes between the rollers of a first double-sided transport roller pair 40b without being headed to the export roller pair 40a, and is transported downward along a path indicated by the downward dotted arrow. Then, the rotation direction of a second double-sided transport roller pair 40c is reversed, thereby changing the sheet transport direction of the sheet of paper to the upward direction. Further, the sheet of paper passes, along a path indicated by the left dotted-line arrow, between the rollers of a third double-sided transport roller pair 40d and the rollers of a fourth double-sided transport roller pair 40e, and is headed to the second transfer roller 3a again through the first transport roller pair 41a, the second transport roller pair 41b, and the alignment roller pair 40. Here, in a time period from when the sheet of paper is subjected to transfer by the second transfer roller 3a for the first time to when the sheet of paper reaches the position of the second transfer roller 3a again, new first transfer images of multiple colors are formed on the intermediate transfer belt 2 using the above-described scheme. Then, when the sheet of paper reaches the second transfer roller 3a for the second time, the new first transfer images of multiple colors are transferred by second transfer onto the other side of the sheet of paper that is the opposite side of the side subjected to second transfer for the first time. Then, a fixing process is performed by the fixing device 4 on a new second transfer image on the opposite side. The sheet of paper having the fixed images on both sides thereof is output to the paper output tray 10a. Here, residual toner that remains on the intermediate transfer belt 2 after second transfer onto the opposite side of the sheet of paper has been performed is removed by the cleaning device 2b.

The series of operations of the image forming apparatus 10 has been described above. In the image forming apparatus 10, formation of a read image on a sheet of paper is performed in this manner.

The series of operations of the image forming apparatus 10 has been described above using, as an example, the case where the stationary reading mode is employed. However, when the transporting reading mode is employed, an operation of reading an image and an operation of forming the image are the same as the above-described operations except that an image on a sheet of paper which is being transported is read using the first carriage 210 that is in the stationary state.

Note that, in the above description, in the case of correcting the position at which an image is to be formed on a sheet of paper, the correction process of correcting the position at which an image is to be formed is performed on an image data item. However, in the present invention, instead of performing the correction process on an image data item, the position at which an image is to be formed on a sheet of paper may be corrected. For example, the alignment roller pair 40 is controlled so that the timing at which a sheet of paper is to be sent out toward the second transfer roller 3a is changed, whereby correction of the position of an entire image on the sheet of paper in the sheet transport direction may be performed. Furthermore, the exposure unit 5 is controlled so that the position from which an electrostatic latent image is to be formed on each of the developer carriers is changed in a direction (a rotation axis direction of each of the developer carriers) perpendicular to the sheet transport direction, whereby correction of the position of an entire image on a sheet of paper in the direction perpendicular to the sheet transport direction may be performed.

Here, in the image forming apparatus 10, the image reading section 200 is not capable of reading, at one time, an image formed on a sheet of paper having a size larger than the size of the transparent glass 250 (i.e., the size of the paper placement table). However, the image forming section 100 is also capable of forming, without the restriction of such a paper size, an image on a sheet of paper having a size larger than the size of the transparent glass 250 (the size of the paper placement table). The reason for this is that the necessity to magnify an image read by the image reading section 200 and form the image on a sheet of paper or the necessity to form an image on a sheet of slightly large paper in order to cut the sheet of paper on which the image is formed so that the sheet of paper has an expected size is taken into consideration. For example, supposing that the size of the transparent glass 250 (the size of the paper placement table) is as large as the size of A3 paper, an A3-size or A4-size image is output on a sheet of paper having a size larger than the size of A3 paper. A process of cutting out a portion of the sheet of paper that is a portion including the A3-size or A4-size image from the sheet of paper having a size larger than the size of A3 paper may be performed. As described, even in the case of outputting an image on a sheet of paper having a size larger than the size of the transparent glass 250 (i.e., the size of the paper placement table), an image having a predetermined size (magnification) is desired to be accurately output at a predetermined position on a sheet of paper, as in the case of outputting an image on a sheet of paper having a size smaller than the size of the transparent glass 250.

Considering this, calculation of the correction amounts for, for example, the position and magnification of an image to be formed on a sheet of paper will be described below.

In the image forming apparatus 10, calculation of the correction amounts for, for example, the position and magnification of an image, which is described below, is performed using the image forming unit 1K for black (K). Note that the correction amounts in the case where the image forming units for the other individual colors of cyan (C), magenta (M), and yellow (Y) are used may be obtained from the correction amounts that have been calculated using the image forming unit 1K for black (K) through the above-described adjustment of the relative positions between the first transfer images, which have been formed by the image forming units for the four colors including the image forming unit 1K for black (K), and magnifications of the first transfer images.

In the image forming apparatus 10, the correction-amount calculation-mode button 2702a included in the operation unit 270 illustrated in FIG. 1 is pressed, whereby the image forming apparatus 10 is set to be in the mode in which the correction amounts are calculated. Here, calculation of the correction amounts is performed for each paper size. Every time the correction-amount calculation-mode button 2702a is pressed, the mode of the image forming apparatus 10 is switched to one of correction-amount calculation modes that are provided on a paper-size-by-paper-size basis. Note that, in the image forming apparatus 10, as long as the correction-amount calculation-mode button 2702a is not pressed, a normal mode in which reading of an image and formation of the image is performed using the above-described scheme is set. The normal mode is a default mode when the image forming apparatus 10 is powered on.

In the image forming apparatus 10, in the case of performing calculation of the correction amounts for, for example, the position at which an image is to be formed and the magnification of an image on a sheet of paper having a size equal to or smaller than the size of the transparent glass 250 (the size of the paper placement table), the test-image data item representing the test image is read from the test-image memory 65, and subjected to the correction processes regarding, for example, the position at which an image is to be formed and the magnification of an image as described above. Additionally, the test image is output on a sheet of paper on the basis of the test-image data item subjected to the correction processes. Then, the test image is read, and information concerning the position of the test image is acquired. The correction amounts for realizing an appropriate state of an image, such as an appropriate position at which an image is formed and an appropriate magnification of an image, are calculated. The calculated correction amounts are stored in a memory corresponding to the type of paper (plain paper, thin paper, or thick paper) in the memory group (see FIG. 1) corresponding to a tray in which the sheet of paper was stored. Here, for calculation of the correction amounts for, for example, the position at which an image is to be formed and the magnification of an image on a sheet of paper having a size equal to or smaller than the size of the transparent glass 250, a correction-amount calculation method that is similar to a correction-amount calculation method of the related art is used. In the correction-amount calculation method of the related art, an entire side of the sheet of paper is placed on the paper placement table, an image on the sheet of paper is read at one time, and various types of correction amounts, such as the correction amount for the position at which an image is to be formed and the correction amount for the magnification of an image, are calculated.

However, for calculation of the correction amounts for, for example, the position at which an image is to be formed and the magnification of an image on a sheet of paper having a size larger than the size of the transparent glass 250 (the size of the paper placement table), the correction-amount calculation method of the related art is not applicable as is. The reason for this is that, in the correction-amount calculation method of the related art, it is impossible to read the test image formed on a sheet of paper having such a large size.

Here, the image forming apparatus 10 is designed to be capable of calculating the correction amounts for, for example, the position at which an image is to be formed and the magnification of an image on a sheet of paper having a size larger than the size of the transparent glass 250 (the size of the paper placement table). Hereinafter, the design will be described. Hereinafter, such paper having a size larger than the size of the transparent glass 250 is referred to as "large-size paper". For simplicity, it is supposed that the size of the transparent glass 250 is larger than half the size of large-size paper but smaller than the size of large-size paper. Furthermore, it is supposed that sheets of large-size plain paper are stored in the first tray 70A illustrated in FIG. 1, that sheets of large-size thick paper are stored in the second tray 70B, and that sheets of plain paper having a size smaller than the size of large-size paper are stored in the third tray 70C illustrated in FIG. 1. Here, as an example, the case where calculation of the correction amounts is performed using the sheets of large-size plain paper stored in the first tray 70A illustrated in FIG. 1 will be described.

Figure 2:
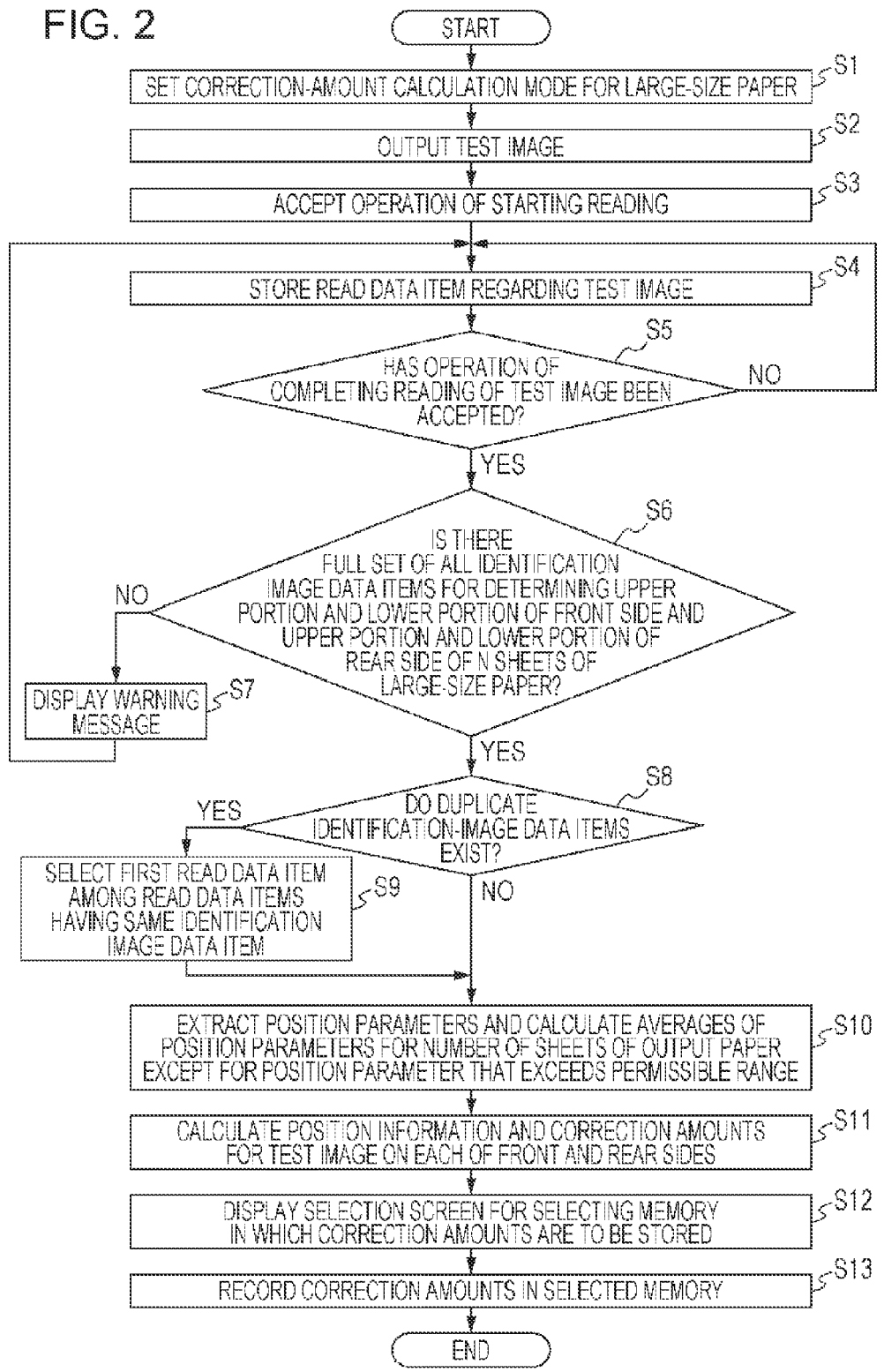
FIG. 2 is a flowchart showing a flow of calculation of correction amounts for a sheet of paper having a size larger than the size of a transparent glass (the size of a paper placement table), which is performed in the image forming apparatus illustrated in FIG. 1.

FIG. 2 is a flowchart showing a flow of calculation of the correction amounts for paper having a size larger than the size of the transparent glass 250 (the size of the paper placement table), which is performed in the image forming apparatus 10 illustrated in FIG. 1.

As described above, in the image forming apparatus 10, calculation of the correction amounts is performed for each paper size. Every time the correction-amount calculation-mode button 2702a is pressed, the mode of the image forming apparatus 10 is switched to one of the correction-amount calculation modes that are provided on a paper-size-by-paper-size basis. Here, by pressing the correction-amount calculation-mode button 2702a only a predetermined number of times, the image forming apparatus 10 is set to be in a mode in which the correction amounts for, for example, the position at which an image is to be formed and the magnification of an image on a sheet of large-size paper are calculated (step S1).

Figure 3:
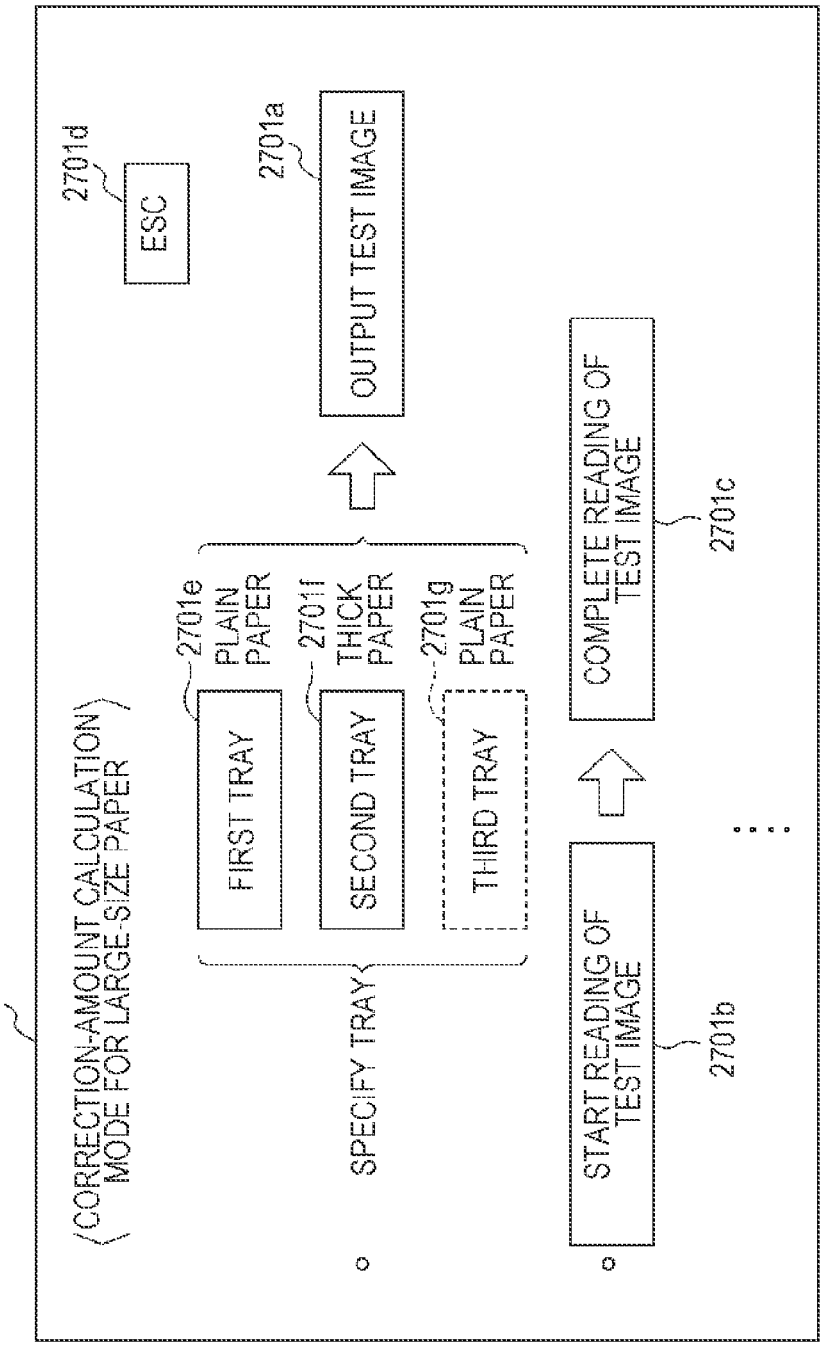
FIG. 3 is a diagram illustrating a screen displayed on a display screen illustrated in FIG. 1.

FIG. 3 is a diagram illustrating a screen displayed on the touch-panel-type display screen 2701 illustrated in FIG. 1 in the case where the image forming apparatus 10 is set to be in the mode in which the correction amounts for, for example, the position at which an image is to be formed and the magnification of an image on a sheet of large-size paper are calculated.

In this screen, three tray fields that are a first tray field 2701e, a second tray field 2701f, and a third tray field 2701g, a test-image output field 2701a, a reading start field 2701b, a reading completion field 2701c, and an ESC field 2701d are displayed as fields that may be touched by a finger of the user. The first tray field 2701e, the second tray field 2701f, and the third tray field 2701g are used to specify paper, on which the test image is to be output, by specifying a tray in which the paper is stored. The test-image output field 2701a is used to provide an instruction to output the test image. The reading start field 2701b is used to notify the image forming apparatus 10 that the user is to cause the image forming apparatus 10 to read the test image. The reading completion field 2701c is used to notify the image forming apparatus 10 that the user has completed a task of causing the image forming apparatus 10 to read the test image. The ESC field 2701d is used to return the mode of the image forming apparatus 10 from the correction-amount calculation mode to the normal mode. Here, as described above, for each of the first tray 70A, the second tray 70B, and the third tray 70C, a type of paper (plain paper, thin paper, or thick paper) is set so that the type of paper stored in the tray corresponds to the tray. In FIG. 3, the type of paper stored in each of the trays is displayed at the side of a corresponding one of the first tray field 2701e, the second tray field 2701f, and the third tray field 2701g. For example, "plain paper" that is a type of large-size paper stored in the first tray 70A is displayed at the side of the first tray field 2701e corresponding to the first tray 70A. Here, in the mode in which the correction amounts for large-size paper are calculated, only a tray field corresponding to a tray in which sheets of large-size paper are stored is selectable. A tray field corresponding to a tray in which sheets of large-size paper are not stored is not selectable. In FIG. 3, the third tray field 2701g corresponding to the third tray 70C in which sheets of large-size paper are not stored is displayed in such a manner as to be surrounded by the dotted line, thereby indicating that the third tray field 2701g is not selectable if the third tray field 2701g is touched by a finger of the user.

In order to perform calculation of the correction amounts for the large-size plain paper (i.e., large-size paper that is neither thin paper nor thick paper), the first tray field 2701e corresponding to the first tray 70A in which sheets of large-size plain paper are stored and which is illustrated in FIG. 1 is touched by a finger of the user. Next, in order to output the test image, the test-image output field 2701a is touched by the finger of the user. The first tray field 2701e has been touched by the finger of the user, whereby it is determined that correction amounts stored in a memory for plain paper which is included in the first-tray memory group 61 illustrated in FIG. 1 and which is not illustrated are to be used as the correction amounts that are to be used in the case of outputting the test image. When the test-image output field 2701a has been touched by the finger of the user, in the image forming section 100 illustrated in FIG. 1, the test-image data item representing the test image is read from the test-image memory 65 illustrated in FIG. 1. The test-image data item is subjected to, by using the correction amounts that are stored at this point in time in the above-mentioned memory for plain paper, the correction processes regarding, for example, the position at which an image is to be formed and the magnification of an image. Then, on the basis of the test-image data item subjected to the correction processes, the test image is output on each of both sides of a predetermined number of sheets (supposing that the predetermined number is N) of large-size paper (step S2 in FIG. 2). An operation of forming an image performed in this case is the same as that performed in the case where double-sided output is selected, which is described above.

Next, the reading start field 2701b is touched by the finger of the user (step S3 in FIG. 2), thereby notifying the image forming apparatus 10 that the user is to cause the image forming apparatus 10 to read the test image. Then, reading of the test image is performed by following the procedure described below.

Figure 4A:
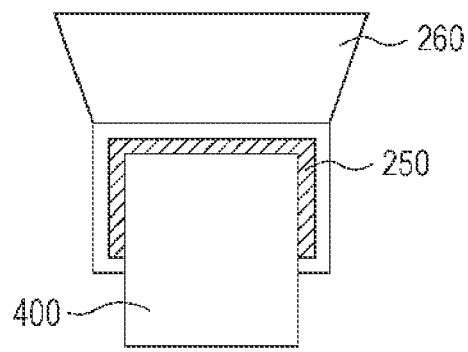
FIGS. 4A to 4C are diagrams illustrating states that, in the case where reading is to be performed on one of N sheets of large-size paper having a test image, end with a state in which the sheet of paper is placed between the transparent glass and an upper covering, which are illustrated in FIG. 1, is performed.
Figure 4B:
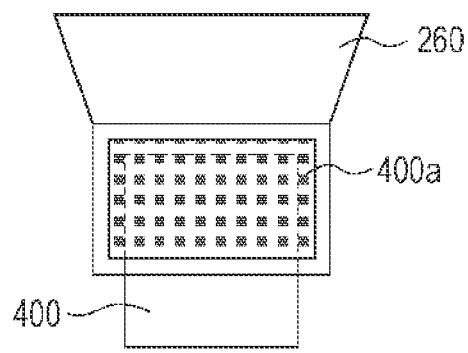
Figure 4C:
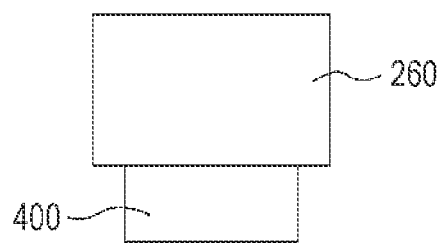

FIGS. 4A to 4C are diagrams illustrating states that, in the case where reading is to be performed on one of the N sheets of large-size paper having the test image, end with a state in which the sheet of paper is placed between the transparent glass 250 and the upper cover 260, which are illustrated in FIG. 1.

First, as illustrated in FIG. 4A, the upper portion of a sheet of large-size paper 400 having the test image is placed on the transparent glass 250 so that a side of the sheet of large-size paper 400 which is a side having an image portion to be read is oriented to the transparent glass 250.

Next, as illustrated in FIG. 4B, a sheet of black paper 400a is placed on the upper portion of the sheet of large-size paper 400 placed on the transparent glass 250. The entire sides of the sheet of black paper 400a are colored in solid black. Accordingly, the upper portion of the sheet of large-size paper 400 is completely covered with the sheet of black paper 400a. The sheet of black paper 400a provides a black background for the sheet of large-size paper 400 so that the edge portions of the sheet of large-size paper 400 are clearly recognized by performing reading.

Next, as illustrated in FIG. 4C, the upper portion of the sheet of large-size paper 400 and the top of the sheet of black paper 400a are covered with the upper cover 260. In this state, reading is performed by the image reading unit 200 illustrated in FIG. 1. The operation of the image reading unit 200 in this case is performed as described with reference to FIG. 1. A read data item representing one portion of the test image that is a read portion is stored in the read-image memory 64. However, differently from the normal mode, in a state in which the correction-amount calculation mode is set, image formation based on the read data item is not performed.

By following the above-described procedure, next, reading is also performed on the lower portion of the sheet of large-size paper 400. Furthermore, reading is also performed on each of the upper portion and the lower portion of the rear side of the sheet of large-size paper 400. Reading of the upper and lower portions of the front side of a sheet of paper and the upper and lower portions of the rear side of the sheet of paper is repeatedly performed for the N sheets of large-size paper having the test image. Every time reading is performed, a read data item is stored in the read-image memory 64 (step S4 in FIG. 2).

Here, the test image will be described.

FIGS. 5A to 5D are diagrams illustrating the test image.

Among the N sheets of large-size paper having the test image, a front side 501A and a rear side 501B of a first sheet of large-size paper and a front side 502A and a rear side 502B of a second sheet of large-size paper are illustrated as examples in FIGS. 5A to 5D, respectively. Here, the rear sides 501B and 502B are sides that appear when the front sides 501A and 502A are rotated by 180 degrees using the longitudinal direction of the sheets of large-size paper as a rotation axis.

On any of the front side 501A and the rear side 501B of the first sheet of large-size paper and the front side 502A and the rear side 502B of the second sheet of large-size paper, an upper-end horizontal line 601, a center horizontal line 602, a lower-end horizontal line 603, a left-end vertical line 604, a center vertical line 605, and a right-end vertical line 606 are shown. These lines are inspection images that are used to detect information concerning an image, such as the position at which an image is formed. Here, in FIGS. 5A to 5D, individual reading regions are illustrated, using the dotted lines, as eight reading regions, i.e., a first-time reading region 701, a second-time reading region 702, a third-time reading region 703, a fourth-time reading region 704, a fifth-time reading region 705, a sixth-time reading region 706, a seventh-time reading region 707, and an eighth-time reading region 708. The reading regions are regions in the case where the upper portion and the lower portion of each of the front side 501A and the rear side 501B of the first sheet of large-size paper and the front side 502A and the rear side 502B of the second sheet of large-size paper are placed using the placement scheme described with reference to FIGS. 4A to 4C and are sequentially subjected to reading. The size of each of the reading regions corresponds to the size of the transparent glass 250 (i.e., the size of the paper placement table). Furthermore, in FIGS. 5A to 5D, the sheet of black paper 400a covering a portion of the sheet of paper that is the portion placed on the transparent glass 250, which is illustrated in FIG. 4B, is illustrated together around each of the sheets of large-size paper.

Figure 5A:
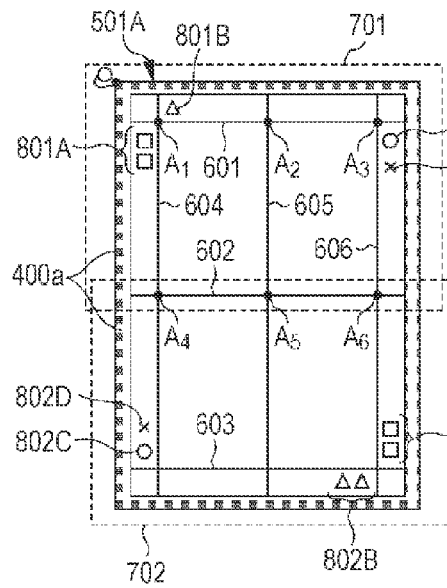
FIGS. 5A to 5D are diagrams illustrating the test image.

As illustrated in FIG. 5A, the first-time reading region 701 and the second-time reading region 702 overlap each other in a region near the center horizontal line 602. Both a read data item representing the upper portion of the front side 501A of the first sheet of large-size paper that is a portion included in the first-time reading region 701 and a read data item representing the lower portion of the front side 501A that is a portion included in the second-time reading region 702 include information concerning the position of the center horizontal line 602.

Figure 5B:
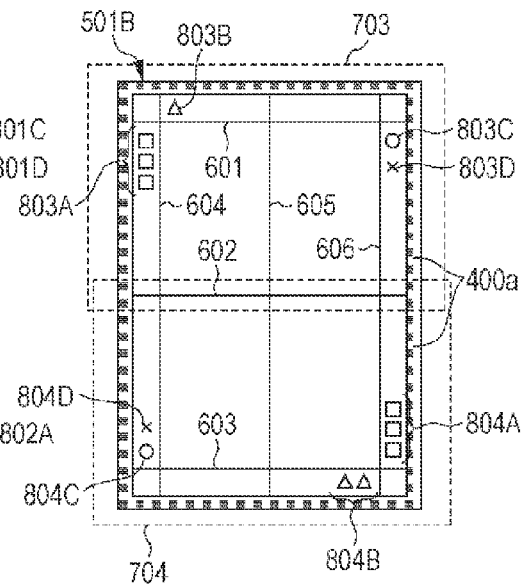
Figure 5C:
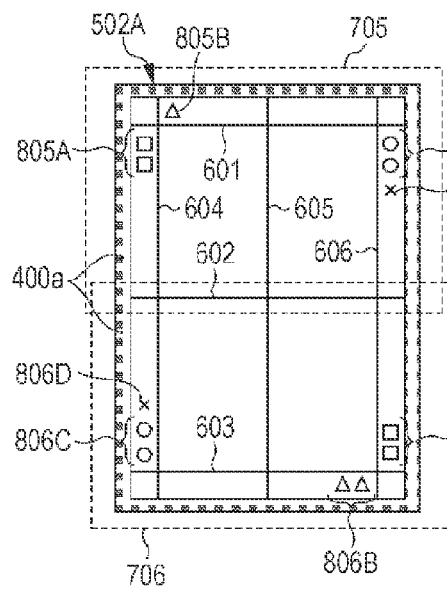
Figure 5D:
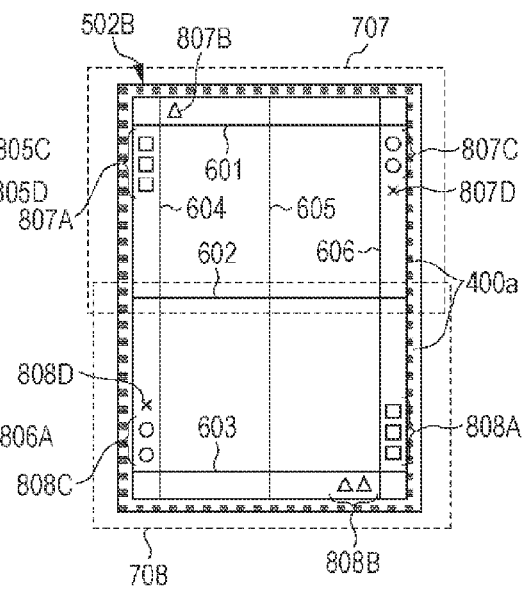

The same is true for FIGS. 5B to 5D. The information concerning the position of the center horizontal line 602 is information in common between a read data item representing the upper portion included in the third-time reading region 703 and a read data item representing the lower portion included in the fourth-time reading region 704, between a read data item representing the upper portion included in the fifth-time reading region 705 and a read data item representing the lower portion included in the sixth-time reading region 706, and between a read data item representing the upper portion included in the seventh-time reading region 707 and a read data item representing the lower portion included in the eighth-time reading region 708.

Here, on the upper portion and the lower portion of each of the front side 501A and the rear side 501B of the first sheet of large-size paper and the front side 502A and the rear side 502B of the second sheet of large-size paper, side identification images 801A to 808A, which are used to distinguish the front side and the rear side of a sheet of large-size paper from each other, and upper/lower-portion identification images 801B to 808B, which are used to distinguish the upper portion and the lower portion of a sheet of large-size paper from each other, are formed. Furthermore, sheet identification images 801C to 808C, which are each used to distinguish a sheet from other sheets by using the position of the sheet in a series of sheets, and tray identification images 801D to 808D, which each indicate a tray from which a sheet of paper has been output, are formed.

For example, in FIGS. 5A to 5D, on the front sides 501A and 502A, the side identification images 801A, 802A, 805A, and 806A are each a common image of "□□". Meanwhile, on the rear sides 501B and 502B, the side identification images 803A, 804A, 807A, and 808A are each a common image of "□□□". The rear side and the front side are distinguished from each other by these two types of images. Furthermore, on the front sides 501A and 502A and the rear sides 501B and 502B, the upper/lower-portion identification images 801B, 803B, 805B, and 807B for the upper portion are each a common image of "Δ". Meanwhile, the upper/lower-portion identification images 802B, 804B, 806B, and 808B for the lower portion are each a common image of "ΔΔ". The upper portion and the lower portion are distinguished from each other by these two types of images. Moreover, the sheet identification images 801C to 804C of the upper and lower portions of the front side 501A and the rear side 501B of the first sheet of large-size paper are each a common image of "○". Meanwhile, the sheet identification images 805C to 808C of the upper and lower portions of the front side 502A and the rear side 502B of the second sheet of large-size paper are each a common image of "○○". The first sheet of large-size paper and the second sheet of large-size paper are distinguished from each other by these two types of images. Here, the tray identification images 801D to 808D are each a common image of "×", because both the first sheet of large-size paper and the second sheet of large-size paper are sheets of paper that have been taken out from the same first tray 70A (see FIG. 1).

The test image used in the image forming apparatus 10 includes the four types of identification images that are the side identification images, the upper/lower-portion identification images, the sheet identification images, and the tray identification images described above, and the inspection images constituted by the six lines that are the upper-end horizontal line 601, the center horizontal line 602, the lower-end horizontal line 603, the left-end vertical line 604, the center vertical line 605, and the right-end vertical line 606.

Here, among the N sheets of large-size paper having the test image, the upper and lower portions of the front side of each sheet and the upper and lower portions of the rear side of each sheet are distinguished from one another by the three types of identification images that are the side identification images, the upper/lower-portion identification images, and the sheet identification images described above. Each of the read image data items is determined on the basis of identification-image data items representing the three types of identification images that are the corresponding side identification image, the corresponding upper/lower-portion identification image, and the corresponding sheet identification image included in the read data item. Note that the tray identification images are each used to determine a memory group (see FIG. 1) for storing the calculated correction amounts, as described below.

Returning to FIG. 2, the description continues.

Until the user determines that reading has been completed for all of the sheets and the reading completion field 2701c illustrated in FIG. 3 is touched by the finger of the user (NO in step S5), reading of the upper and lower portions of the front side and the upper and lower portions of the rear side of each of the N sheets of large-size paper having the test image and storage of read data items continues (step S4). When the user determines that reading has been completed for all of the sheets and the reading completion field 2701c illustrated in FIG. 3 is touched by the finger of the user (YES in step S5), next, the controller 6 illustrated in FIG. 1 analyzes identification-image data items included in the read data items that are stored in the read-image memory 64 and that have been obtained by reading the test image. The controller 6 determines whether or not there is a full set of identification-image data items that are used to individually determine the upper and lower portions of the front side and the upper and lower portions of the rear side of the N sheets of large-size paper having the test image (step S6).

When it is determined that there is not a full set of identification-image data items because of a circumstance where, for example, the user forgot to perform reading on some of sheets (NO in step S6), the controller 6 illustrated in FIG. 6 displays, on the display screen 2701 illustrated in FIG. 1, a warning message saying that, among the upper and lower portions of the front side and the upper and lower portions of the rear side of the N sheets of large-size paper having the test image, a portion which has not been subjected to reading exists and reading should be performed again on a portion having identification images represented by identification-image data items that are missing (step S7). For example, a warning message saying that "reading of the lower portion of the rear side of the second sheet has not been performed. Please place the lower portion of the rear side of the second sheet on the paper placement table and perform reading again." is displayed. The portion that has not been subjected to reading is placed using the placement scheme described with reference to FIGS. 4A to 4C, and reading is performed to obtain a read data item. Furthermore, the read data item is stored in the read-image memory 64 illustrated in FIG. 1 (step S4). When the reading completion field 2701c illustrated in FIG. 3 has been touched by the finger of the user (YES in step S5), whether or not there is a full set of identification-image data items is determined again (step S6).

When it is determined that there is a full set of identification-image data items (YES in step S6), next, the controller 6 illustrated in FIG. 1 analyzes the identification-image data items included in the read data items that are stored in the read-image memory 64 until now and that have been obtained by reading the test image, and determines whether or not duplicate identification-image data items exist (step S8).

When duplicate identification-image data items exist (YES in step S8) because of a circumstance where, for example, the user has incorrectly performed reading on the same portion, resulting in duplicate identification-image data items (YES in step S8), the controller 6 illustrated in FIG. 1 selects a read data item that is first stored in the read-image memory 64 among the read data items including the duplicate identification-image data items (step S9).

All of the read data items in the case where duplicate identification-image data items do not exist (NO in step S8), or the read data items that remain after selection of a read data item is performed (step S9) because duplicate identification-image data items exist (YES in step S8) are 4N read image data items, where the number of read image data items is represented by an equation 2×2×N=4N, corresponding to the upper and lower portions of the front side and the upper and lower portions of the rear side of the N sheets of large-size paper having the test image. The controller 6 illustrated in FIG. 1 extracts, for each of the 4N read data items, position parameters of a detected image represented by the read data item. Extraction of position parameters is specifically described using, as an example, the upper portion illustrated in FIG. 5A. First, in a read image, a place at which a black portion caused by the sheet of black paper 400a illustrated in FIG. 4 changes into a white portion corresponding to paper is determined, whereby an edge of a sheet of paper is obtained. Accordingly, the position of a corner of the sheet of paper that is one point of intersection at the edge is determined as an origin O (see FIG. 5A). Next, each of the upper-end horizontal line 601, the center horizontal line 602, the left-end vertical line 604, the center vertical line 605, and the right-end vertical line 606 is detected. The individual coordinates of six points of intersection $A_1, A_2, A_3, A_4, A_5$, and $A_6$ are obtained. The values of the coordinates of the six points of intersection are position parameters of the detected images that are described above.

Next, the controller 6 illustrated in FIG. 6 averages the position parameters over the N sheets of large-size paper having the test image. For example, for each of the six points of intersection in the upper portion of the front side of the individual N sheets of large-size paper, the controller 6 illustrated in FIG. 6 obtains the average of the values of each of the coordinates of the point over the N sheets of large-size paper. Here, when the value of any of the coordinates of any of the six points of intersection exceeds a predetermined range, there is a probability that the position parameters have been incorrectly detected. In such a case, a sheet of paper having a point of intersection having even one coordinate whose value exceeds the predetermined range is excluded from the sheets over which the above-described averages are to be calculated. The averages are calculated over the remaining sheets of paper (step S10).

Next, the controller 6 illustrated in FIG. 1 calculates, for each of the front and rear sides, various types of position information, such as a distance between the upper-end horizontal line 601 and the lower-end horizontal line 603, a distance between the left-end vertical line 604 and the right-end vertical line 606, a distance between the upper edge and the upper-end horizontal line 601, and a distance between the left edge and the left-end vertical line 604 in the test image (see FIGS. 5A to 5D).

For example, regarding the distance between the upper-end horizontal line 601 and the lower-end horizontal line 603, in the upper portion of large-size paper, a distance between the averages of the values of the coordinates of the point of intersection between the upper-end horizontal line 601 and the center vertical line 605 and the averages of the values of the coordinates of the point of intersection between the center horizontal line 602 and the center vertical line 605 is calculated. In the lower portion of large-size paper, a distance between the averages of the values of the coordinates of the point of intersection between the lower-end horizontal line 603 and the center vertical line 605 and the averages of the values of the coordinates of the point of intersection between the center horizontal line 602 and the center vertical line 605 is calculated. The distance between the upper-end horizontal line 601 and the lower-end horizontal line 603 is calculated as the sum of the calculated distance in the upper portion and the calculated distance in the lower portion. Furthermore, regarding the distance between the left-end vertical line 604 and the right-end vertical line 606, in each of the upper portion and the lower portion of large-size paper, a distance between the averages of the values of the coordinates of the point of intersection between the center horizontal line 602 and the left-end vertical line 604 and the averages of the values of the coordinates of the point of intersection between the center horizontal line 602 and the right-end vertical line 606 is calculated. The distance between the left-end vertical line 604 and the right-end vertical line 606 is calculated as the average of the calculated distance in the upper portion and the calculated distance in the lower portion. Moreover, the distance between the upper edge and the upper-end horizontal line 601 and the distance between the left edge and the left-end vertical line 604 may be obtained as the value of the coordinate in the direction along the left-end vertical line 604 and the value of the coordinate in the direction along the upper-end horizontal line 601 that are the averages of the values of the coordinates of the point of intersection between the upper-end horizontal line 601 and the left-end vertical line 604.

Here, the magnification of the test image in the vertical direction of FIG. 5 is determined in accordance with the distance between the upper-end horizontal line 601 and the lower-end horizontal line 603. The magnification of the test image in the horizontal direction of FIG. 5 is determined in accordance with the distance between the left-end vertical line 604 and the right-end vertical line 606. Furthermore, the position of the test image on a sheet of large-size paper is determined in accordance with the distance between the upper edge and the upper-end horizontal line 601 and the distance between the left edge and the left-end vertical line 604. The controller 6 illustrated in FIG. 1 calculates the correction amounts for the position at which an image is to be formed and the magnification of an image that are necessary to make the two types of magnifications and the position of the test image on a sheet of large-size paper appropriate (step S11). In this manner, for the front and rear sides of a sheet of large-size paper, the correction amounts for the front side and the correction amounts for the rear side are calculated.

When the correction amounts have been calculated, next, the controller 6 illustrated in FIG. 1 determines, on the basis of data items representing the tray identification images among the identification-image data items, a tray from which the sheets of large-size paper have been taken out (in the example used in this description, the first tray 70A illustrated in FIG. 1). The controller 6 displays, on the display screen illustrated in FIG. 1, a selection screen (not illustrated) for selecting a memory in which the correction amounts are to be stored among the memory for plain paper, the memory for thin paper, and the memory for thick paper which are included in the memory group (in the example used in this description, the first-tray memory group 61 illustrated in FIG. 1) corresponding to the determined tray (step S12). Here, the reason why the user selects a memory in accordance with the type of paper (plain paper, thin paper, or thick paper) is that this is useful for management of the correction amounts for each of the types of paper.

When the user has selected, via the selection screen, the memory for plain paper included in the first-tray memory group 61, the controller 6 illustrated in FIG. 1 stores the correction amounts (the correction amounts for the front side and the correction amounts for the rear side) in the selected memory (step S13). Here, in the case of storing the correction amounts, correction amounts that are originally stored in the memory are overwritten with the new correction amounts that have been calculated through the above-described process.

As described above, in the image forming apparatus 10, even in the case of outputting the test image on a sheet of paper having a size larger than the size of the transparent glass 250 (i.e., the size of the paper placement table or a readable region), the test image includes the identification images by which the upper and lower portions of the front side and the upper and lower portions of the rear side of the N sheets of large-size paper having the test image are distinguished from one another. Accordingly, reading is performed on each of both sides of each of the sheets of large-size paper in such a manner that the upper portion and the lower portion of the side are separately subjected to reading, thereby obtaining read data items. The correction amounts for, for example, the position at which an image is to be formed for each of both sides of large-size paper may be calculated from the read data items.

More particularly, the accuracy of the correction amounts is improved by calculating the averages of the position parameters (the values of the coordinates) over the number of sheets of paper, compared with the accuracy of the correction amounts in the case where calculation of the averages of the position parameters is not performed (in the case where the test image is output on only both sides of one sheet of paper).

Furthermore, in the case of reading the test image, even when a portion that needs to be read is missing because of, for example, an incorrect operation performed by the user, a warning message is displayed. Accordingly, the user easily recognizes the existence of the missing portion, and is prompted to perform reading again.

The foregoing description of the exemplary embodiment of the present invention has been provided for the purposes of illustration and description. It is not intended to be exhaustive or to limit the invention to the precise forms disclosed. Obviously, many modifications and variations will be apparent to practitioners skilled in the art. The embodiment was chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. An image forming apparatus comprising:
a document reading section that reads a document image placed on a paper placement table and that generates image data; and
an image forming section that forms an image on a sheet of paper on the basis of the image data generated by the document reading section,
wherein the image forming section includes a memory that stores test data representing a test image, the test image being an image which is to be formed on a sheet of paper having a size larger than the size of the paper placement table, having regions, and including a plurality of identification images in a case where the sheet of paper placed on the paper placement table is to be changed from one orientation to another orientation among a plurality of orientations, each of the plurality of identification images being an image which is formed on the portion of the sheet of paper that is placed on the paper placement table so as to have a corresponding one of the plurality of orientations and which is to be used to determine a corresponding one of the regions of the test image, the plurality of identification images being dispersively disposed in the test image so that each of the plurality of identification images is included in the portion of the sheet of paper which is placed on the paper placement table so as to have a corresponding one of the plurality of orientations,
wherein the image forming section has a test-image formation mode in which the test image based on the test data stored in the memory is formed on a sheet of paper having a size larger than the size of the paper placement table,
wherein the image forming section further includes
a correction-amount calculation unit that calculates correction amounts, which are to be used in image correction, on the basis of image data representing the test image which has been read by repeatedly performing the operation of placing a sheet of paper on which the test image has been formed in the test-image formation mode on the paper placement table in such a manner that one of portions of the sheet of paper is placed on the paper placement table and the other portions of the sheet of paper are present outside the paper placement table and of reading an image that is included in one of the regions of the test image, and
a correction-amount memory that stores the correction amounts calculated by the correction-amount calculation unit, and
wherein the image forming section forms, on a sheet of paper, an image that has been corrected on the basis of the correction amounts stored in the correction-amount memory.

2. The image forming apparatus according to claim 1,
wherein the image forming section has a function of forming an image on each of a front side and a rear side of the sheet of paper,
wherein the test image is an image which is formed on each of the front side and the rear side of the sheet of paper, and the plurality of identification images further include images that identify the front side and the rear side of the sheet of paper, and
wherein the image forming section forms, in the test-image formation mode, on the basis of the test data stored in the memory, the test image on each of the front side and the rear side of the sheet of paper.

3. The image forming apparatus according to claim 1,
wherein the test image is an image which is formed on each of a plurality of sheets of paper having a size larger than the size of the paper placement table, and the plurality of identification images further include images that identify a sequence of the plurality of sheets of paper, and
wherein the image forming section forms, in the test-image formation mode, on the basis of the test data stored in the memory, the test image on each of the plurality of sheets of paper.

4. The image forming apparatus according to claim 2,
wherein the test image is an image which is formed on each of a plurality of sheets of paper having a size larger than the size of the paper placement table, and the plurality of identification images further include images that identify a sequence of the plurality of sheets of paper, and
wherein the image forming section forms, in the test-image formation mode, on the basis of the test data stored in the memory, the test image on each of the plurality of sheets of paper.

5. The image forming apparatus according to claim 1, further comprising a warning section that determines whether or not the entire test image, which has been formed in the test-image formation mode, has been read by the document reading section, and that provides a warning showing an orientation information of a region when the region has not been read.

6. The image forming apparatus according to claim 2, further comprising a warning section that determines whether or not the entire test image, which has been formed in the test-image formation mode, has been read by the document reading section, and that provides a warning identifying an orientation information and a side information of a region when the region has not been read.

7. The image forming apparatus according to claim 3, further comprising a warning section that determines whether or not the entire test image, which has been formed in the test-image formation mode, has been read by the document reading section, and that provides a warning identifying an orientation information and a sequence information of a region when the region has not been read.

8. The image forming apparatus according to claim 4, further comprising a warning section that determines whether or not the entire test image, which has been formed in the test-image formation mode, has been read by the document reading section, and that provides a warning identifying an orientation information, a side information and a sequence information of a region when the region has not been read.

9. An image forming method comprising:
reading a document image placed on a paper placement table and generating image data; and
forming an image on a sheet of paper on the basis of the generated image data,
wherein the forming includes
storing test data representing a test image, the test image being an image which is to be formed on a sheet of paper having a size larger than the size of the paper placement table, having regions, and including a plurality of identification images in a case where the sheet of paper placed on the paper placement table is to be changed from one orientation to another orientation among a plurality of orientations, each of the plurality of identification images being an image which is formed on the portion of the sheet of paper that is placed on the paper placement table so as to have a corresponding one of the plurality of orientations and which is to be used to determine a corresponding one of the regions of the test image, the plurality of identification images being dispersively disposed in the test image so that each of the plurality of identification images is included in the portion of the sheet of paper which is placed on the paper placement table so as to have a corresponding one of the plurality of orientations, forming the test image based on the stored test data on a sheet of paper having a size larger than the size of the paper placement table, calculating correction amounts, which are to be used in image correction, on the basis of image data representing the test image which has been read by repeatedly performing the operation of placing a sheet of paper on which the test image has been formed on the paper placement table in the forming of the test image in such a manner that one of portions of the sheet of paper is placed on the paper placement table and the other portions of the sheet of paper are present outside the paper placement table and of reading an image that is included in one of the regions of the test image, and storing the calculated correction amounts, and wherein, in the forming, an image that has been corrected on the basis of the stored correction amounts is formed on a sheet of paper.

10. A non-transitory computer-readable medium storing a program causing a computer to execute a process, the process comprising:

reading a document image placed on a paper placement table and generating image data; and forming an image on a sheet of paper on the basis of the generated image data, wherein the forming includes storing test data representing a test image, the test image being an image which is to be formed on a sheet of paper having a size larger than the size of the paper placement table, having regions, and including a plurality of identification images in a case where the sheet of paper placed on the paper placement table is to be changed from one orientation to another orientation among a plurality of orientations, each of the plurality of identification images being an image which is formed on the portion of the sheet of paper that is placed on the paper placement table so as to have a corresponding one of the plurality of orientations and which is to be used to determine a corresponding one of the regions of the test image, the plurality of identification images being dispersively disposed in the test image so that each of the plurality of identification images is included in the portion of the sheet of paper which is placed on the paper placement table so as to have a corresponding one of the plurality of orientations, forming the test image based on the stored test data on a sheet of paper having a size larger than the size of the paper placement table, calculating correction amounts, which are to be used in image correction, on the basis of image data representing the test image which has been read by repeatedly performing the operation of placing a sheet of paper on which the test image has been formed on the paper placement table in the forming of the test image in such a manner that one of portions of the sheet of paper is placed on the paper placement table and the other portions of the sheet of paper are present outside the paper placement table and of reading an image that is included in one of the regions of the test image, and storing the calculated correction amounts, and wherein, in the forming, an image that has been corrected on the basis of the stored correction amounts is formed on a sheet of paper.

11. Test data stored in a memory of an image forming apparatus, the image forming apparatus includes a document reading section that reads a document image placed on a paper placement table and that generates image data; and an image forming section that forms an image on a sheet of paper on the basis of the image data generated by the document reading section, wherein the image forming section includes the memory that stores the test data representing a test image, the test image being an image which is to be formed on a sheet of paper having a size larger than the size of the paper placement table, which is to be used to obtain correction amounts that are to be used in image correction, and which has regions, wherein the image forming section has a test-image formation mode in which the test image based on the test data stored in the memory is formed on a sheet of paper having a size larger than the size of the paper placement table, wherein the image forming section further includes a correction-amount calculation unit that calculates the correction amounts, which are to be used in image correction, on the basis of image data representing the test image which has been read by repeatedly performing an operation of placing a sheet of paper on which the test image has been formed in the test-image formation mode on the paper placement table in such a manner that one of portions of the sheet of paper is placed on the paper placement table and the other portions of the sheet of paper are present outside the paper placement table and of reading an image that is included in one of the regions of the test image, and a correction-amount memory that stores the correction amounts calculated by the correction-amount calculation unit, wherein the image forming section forms, on a sheet of paper, an image that has been corrected on the basis of the correction amounts stored in the correction-amount memory, and wherein the test image includes a plurality of identification images in a case where the sheet of paper placed on the paper placement table to be changed from one orientation to another orientation among a plurality of orientations, each of the plurality of identification images being an image which is formed on the portion of the sheet of paper that is placed on the paper placement table so as to have a corresponding one of the plurality of orientations and which is to be used to determine a corresponding one of the regions of the test image, the plurality of identification images being dispersively disposed in the test image so that each of the plurality of identification images is included in the portion of the sheet of paper which is placed on the paper placement table so as to have a corresponding one of the plurality of orientations.

* * * * *